United States Patent [19]

Kromrey

[11] 4,448,742

[45] May 15, 1984

[54] LOW COST THERMAL PROTECTION SYSTEM PROCESSING

[75] Inventor: Robert V. Kromrey, Campbell, Calif.

[73] Assignee: The United States of America as represented by the Secretary of the Air Force, Washington, D.C.

[21] Appl. No.: 370,233

[22] Filed: Apr. 21, 1982

[51] Int. Cl.³ ............................................. B29D 3/00
[52] U.S. Cl. .................................. 264/270; 264/310; 264/311; 425/429; 425/435
[58] Field of Search ....................... 264/270, 310, 311

[56] References Cited

U.S. PATENT DOCUMENTS

| 2,513,289 | 7/1950 | Crom | 264/270 |
| 3,475,532 | 10/1969 | Guldenfels et al. | 264/310 |
| 4,097,572 | 6/1978 | Walker | 264/310 |
| 4,150,176 | 4/1979 | Beckers | 264/270 |

FOREIGN PATENT DOCUMENTS

| 2163890 | 7/1973 | Fed. Rep. of Germany | 264/310 |
| 42064 | 11/1978 | Japan | 264/310 |

OTHER PUBLICATIONS

Aviation Week and Space Technology, Apr. 27, 1981, pp. 175-176.

*Primary Examiner*—James H. Derrington
*Attorney, Agent, or Firm*—Donald J. Singer; Charles E. Bricker

[57] ABSTRACT

A method and apparatus for spin casting a castable material into a cylindrical body. The method comprises the steps of rotating an elongated cylindrical body about its longitudinal axis, applying an extrudable uncured material as a continuous stream in helical fashion from one point in the body to another point, continuing to rotate the body until the material is leveled and at least partially curing the material while continuing to rotate the body. The apparatus comprises means for holding and spinning an elongated cylindrical body, and extruder means for providing a continuous stream of an extrudable uncured material in a desired fashion along the inside of the cylindrical body.

10 Claims, 7 Drawing Figures

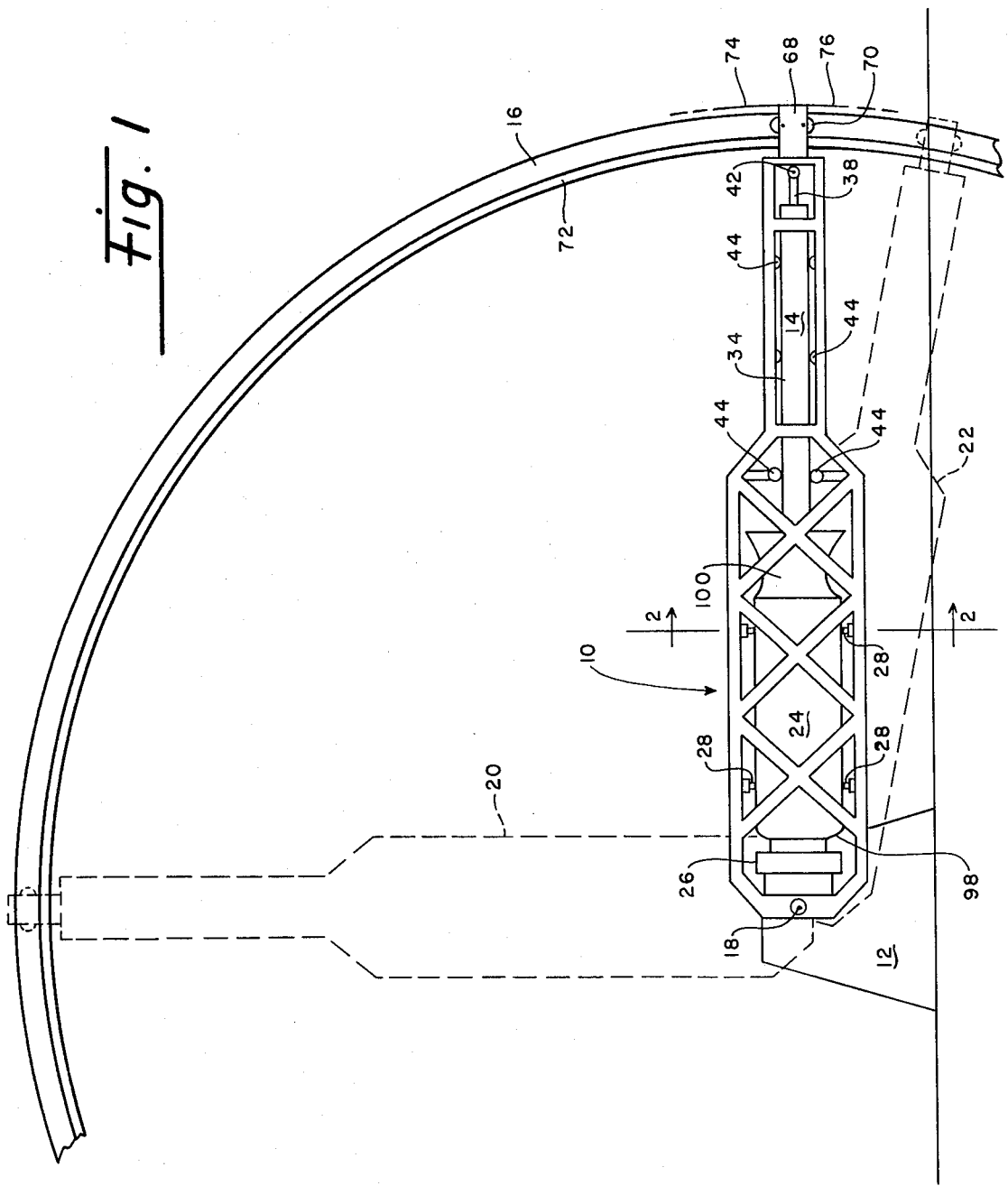

4,448,742

LOW COST THERMAL PROTECTION SYSTEM PROCESSING

RIGHTS OF THE GOVERNMENT

The invention described herein may be manufactured and used by or for the Government of the United States for all governmental purposes without the payment of any royalty.

BACKGROUND OF THE INVENTION

This invention relates to a method for forming a concentric layer of controlled thickness on the interior of a cylindrical body. This invention further relates to an apparatus for forming the said layer.

Generally used methods for application of polymeric ablative materials in ramjet combustors are by transfer molding, back extrusion (plunge casting), vacuum filling, and spin casting. The first three methods require a core-forming insert or mandrel that molds or shapes the inside surface of the insulating ablative material. Spin casting does not require an insert or mandrel. Instead, the inside surface is formed by centrifugal force, concentric with the spin axis.

Transfer molding involves filling the annulus between the cylindrical body and the core-forming insert or mandrel with the ablative material by pumping or by transfer from a pressurized vessel. The annulus may often have a width of 0.25 inch or less. Extreme care must be exercised to avoid entrapment of air or other gas in the material during such filling. The most significant problem with injection molding into a narrow annulus is alignment of reinforcing fibers, admixed with the polymeric material, parallel to the forming surfaces. In-plane alignment becomes a major problem because the fibers do not provide the radial reinforcement required for char stability. In-plane fibers allow axial fissures and also promote stratification of char layers, allowing them to slough.

Back extrusion or plunge casting comprises forcing a mandrel into a mold containing a pool of uncured material. The uncured material is forced into the thus-formed annulus in a manner similar to compression molding. Precise alignment of the mandrel and the mold is necessary to produce concentricity and uniformity of the uncured material. Undesirable fiber alignment results because of wall drag; fibers are oriented axially rather than concentrically.

Vacuum filling is similar, in terms of material transfer, to transfer molding. A mandrel is used, but instead of forcing the polymeric material into the annulus, the annulus is evacuated to a low pressure, and atmospheric pressure then forces the uncured resin into the annulus. This method has the same fiber alignment problems as transfer molding.

Spin casting differs from the above-described processes in that an insert or mandrel is not used. The cylindrical body or mold is spun while an uncured resin is deposited along the inside wall of the mold. The rate of spinning, and the resultant centrifugal force causes the uncured resin to flow axially to level the surface. An excessive spinning rate can cause segregation of the resin and any fillers and/or reinforcing fibers admixed therewith. Leveling of the resin at reasonable speeds, i.e., speeds which will not cause segregation, is somewhat limited. Variations of 0.010 to 0.020 inch or more have been observed over an axial distance as small as 6 inches.

Various spin casting techniques have been employed to introduce an uncured compound to the inside of the cylindrical mold. Early methods involved pouring the uncured material into the cylinder while stationary, revolving the cylinder slowly to distribute the mass, and finally, spinning rapidly to level the surface. This method is not highly successful because the uncured fluid may drip or fold over itself during the slow spinning step, entrapping air in the mass. Further, circumferential and axial leveling are often less than required, resulting in the need to machine the surface.

Slow speed spinning with a doctor blade has been attempted to distribute the uncured material. Air entrapment occurs because the blade causes the fluid material to fold over itself during spinning. The slow speed of revolution necessary in order to use the doctor blade does not provide sufficient centrifugal force to deaerate the viscous mass. Moreover, it is difficult to remove the doctor blade without disturbing the uncured polymeric surface.

Current spin casting methods are not fast enough or economical for high rate production. Also, concave surfaces, precisely defined tapered surfaces and the like, are difficult to form using current methods.

Accordingly, it is an object of the present invention to provide an improved method for spin casting.

It is another object of the present invention to provide a novel apparatus for spin casting.

Other objects and advantages of the present invention will be apparent to those skilled in the art from a consideration of the following description and the attached drawings.

SUMMARY OF THE INVENTION

In accordance with the present invention there is provided an improved method for spin casting which comprises the steps of rotating an elongated cylindrical body at a desired speed of rotation about its longitudinal axis, applying an extrudable uncured material as a continuous stream in helical fashion, with each newly applied portion being contiguous to the next immediately applied portion, from one selected point in the body to another selected point in the body, continuing to rotate the body until the material is leveled between the selected points, and at least partially curing the material while continuing to rotate the cylindrical body.

Also provided in accordance with the present invention is an apparatus for spin casting which comprises means for holding and spinning an elongated cylindrical body, and estruder means for providing a continuous stream of an extrudable uncured material in a desired fashion along the inside of the cylindrical body.

BRIEF DESCRIPTION OF THE DRAWINGS

FIG. 1 is a plan view of a spin casting apparatus in accordance with the invention;

DESCRIPTION OF THE PREFERRED EMBODIMENT

The method of this invention is generally applicable to the manufacture of any cylindrical body having a cast-in-place liner. It is particularly applicable to the manufacture of a cylindrical body having a relatively thin cast-in-place liner, and more particularly, one in which the bore dimension is quite uniform. The method of this invention has been employed to fabricate a metal cylindrical body having an elastomeric insulating lining having a thickness of 0.5 to 0.6 inch with a bore uniformity of 0.004 inch over a length of 38 inches.

Figure 2:
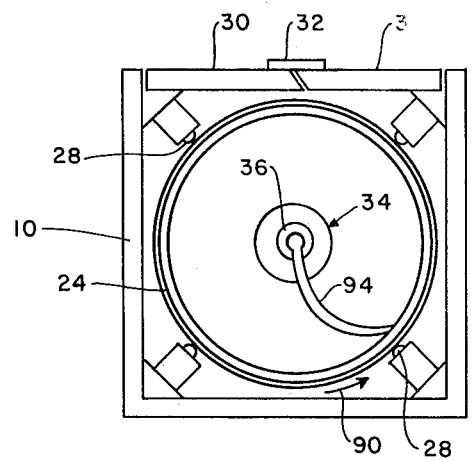
FIG. 2 is a cross-sectional view taken through 2—2 of FIG. 1.

Referring now to the drawings, FIG. 1 illustrates an appartus for spin casting which comprises a frame assembly 10, a base 12, an extruder assembly 14, and a curved track assembly 16. The frame assembly 10 is connected to the base 12 by pivot pin 18 and can be rotated from the horizontal position shown to the vertical position indicated by the dashed outline 20, to the below-horizontal position indicated by the dashed outline 22, or to any position therebetween. The frame assembly 10 is adapted for holding and rotating a cylindrical body 24 for spin casting, and comprises a rotating means 26, such as an electric or hydraulic motor, for rotating body 24 at a desired rotational speed. The rotating means 26 is secured to the frame assembly 10 and is demountably attached to body 24 by conventional means. Frame assembly 10 is provided with a plurality of guide rollers 28 which support body 24 and maintain it in axial alignment about its rotational axis. The guide rollers 28 may be fixed, but are preferably adjustable in order to compensate for difference in the outer diameter of cylindrical bodies. As shown in FIG. 2, frame assembly 10 comprises a pair of hinged sections 30 which can be opened to insert and remove the body 24. The sections 30 are secured in the closed position by locking means 32.

Figure 3:
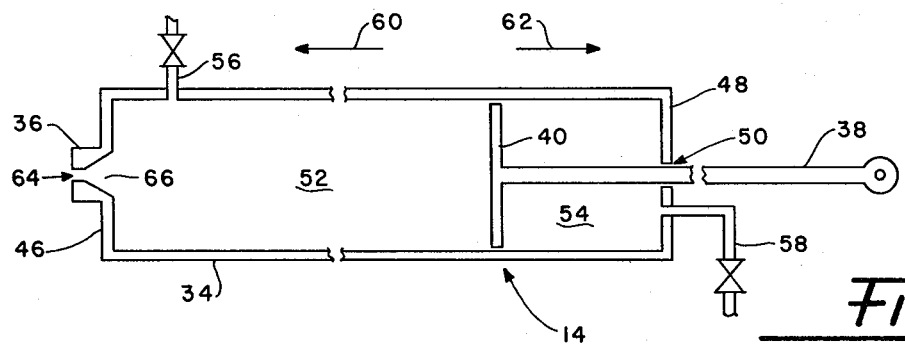
FIG. 3 is a longitudinal cross section of an extruder assembly for use with the apparatus shown in FIG. 1.

The frame assembly 10 also provides support for the extruder assembly 14. Referring now to FIG. 3, the extruder assembly comprises a movable cylinder 34 having an extruder head 36, and a stationary connecting rod 38 with attached piston 40. The connecting rod 38 is demountably attached to frame assembly 10, as shown at 42 in FIG. 1. The frame assembly 10 is provided with a plurality of cylinder guide rollers 44 adapted to guide and maintain cylinder 34 in axial alignment with the rotational axis of cylindrical body 24 as the cylinder 34 is introduced into and withdrawn from body 24.

The extruder cylinder 34 is closed at both ends, one end 46 having the extruder head 36 demountably attached thereto, and the opposite end 48 having an opening 50 for the connecting rod 38 to pass through, the opening 50 having suitable sealing means, not illustrated. Thus, the cylinder 34 has two chambers, a materials chamber 52 and a pressure chamber 54.

The chamber 52 is provided with a material inlet conduit 56 for filling chamber 52 with an extrudable material, discussed hereinafter, and chamber 54 is provided with conduit means 58 for applying a reduced or an increased pressure to chamber 54. The chamber 52 is filled by connecting a supply of extrudable material to inlet conduit 56 and thereafter applying a reduced pressure to chamber 54 through conduit means 58. While filling, the cylinder 34 moves to the left as indicated by the arrow 60, increasing the volume of chamber 52 and decreasing the volume of chamber 54. During extrusion, an increased pressure is applied to the chamber 54 through conduit means 58, and the cylinder moves to the right, as indicated by arrow 62, increasing the volume of chamber 54 and decreasing the volume of chamber 52 while forcing the extrudable material through the orifice 64 of the extruder head 36. The passage 66 between the chamber 52 and the orifice 64 is conical, with the widest portion of the passage in communication with the chamber 52.

The extruder assembly 14 is of the positive displacement type. Any axial movement of the cylinder 34 in the direction 62 causes extrusion and delivery of extrudable material from chamber 52. The chamber 52, in its maximum configuration, i.e., when the cylinder end 48 abuts piston 40, is preferably sized to contain exactly the volume of extrudable material that is desired on the interior of the cylindrical body 24.

Referring again to FIG. 1, at the outer end of frame assembly 10 is a tracking assembly 68 having a plurality of tracking wheels 70 which ride upon the flanged portion 72 of the curved track assembly 16. The wheels 70 may be motorized in order to raise and lower the frame assembly 10 between positions 20 and 22, or the assembly may be raised and lowered by means of cables 74 and 76, each attached to winching means, not illustrated.

Figure 4:
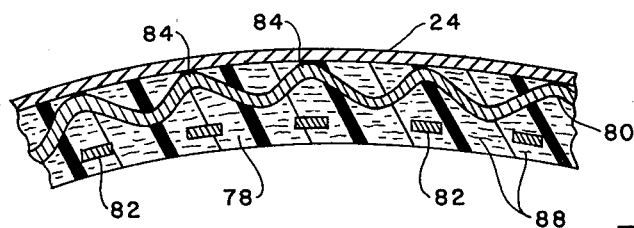
FIG. 4 is a cross-sectional view through a transverse portion of a cylindrical body fabricated in accordance with the invention.

FIG. 4 illustrates a portion of a cylindrical body 24 having a spun-cast liner 78. Although the body 24 is illustrated as being metal, it may be any material having sufficient hoop strength to withstand the centrifugal force encountered while spinning, without deforming. Although not required for all spun-cast structures, the body 24 may have a plurality of circumferential sinusoidal reinforcing ribbons 80 and a plurality of axial sinusoidal reinforcing ribbons 82, each firmly attached to body 24 as indicated, for example, by weldment 84. Alternatively, as shown in FIG. 5, the liner 78 may be anchored to body 24 by a plurality of brackets 86.

Figure 5:
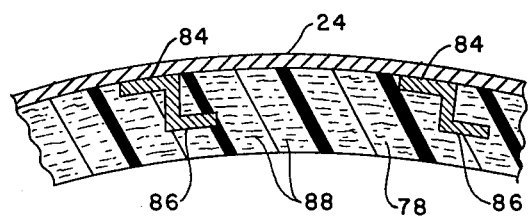
FIG. 5 is an alternative embodiment of the invention shown in FIG. 4.

The liner 78 is illustrated in FIGS. 4 and 5 as having a plurality of reinforcing fibers 88 homogeneously dispersed therethrough. A majority of the fibers 88, i.e., at least about 50%, are oriented circumferentially, i.e., approximately perpendicular to the central longitudianal axis of the cylindrical body 10.

Figure 6:
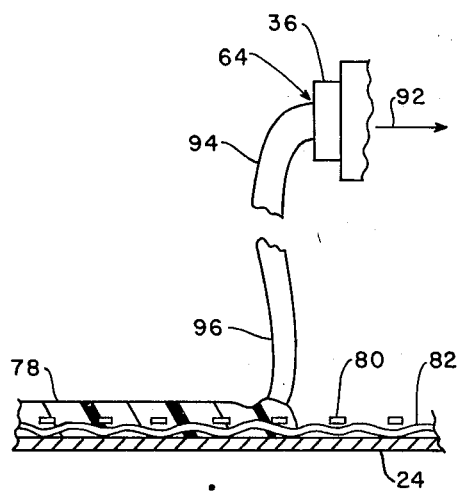
FIG. 6 is a longitudinal cross section through a portion of a cylindrical body showing application and smoothing out of a polymeric material.

The liner 78 is applied to the interior of the cylindrical body 24 as shown in FIGS. 2 and 6. The body 24 is first mounted for rotation in the apparatus previously described. The extruder assembly 14 filled with a desired extrudable material is introduced into the body 24. During operation, the body is revolved at a desired rate of revolution R in the direction indicated by the arrow 90 and an increased pressure is applied to chamber 54 of extruder cylinder 34 which causes the cylinder 34 to move in the direction indicated by arrow 92 at a desired axial rate A. As the cylinder 34 moves, a ribbon or bead 94 is extruded through the extruder head 36 and out the orifice 64. Initially, the bead 94 falls vertically toward the body 24. Once the bead 94 contacts and wets the inner surface of body 24, it is, in essence, pulled into place. The bead is pulled into place in helical fashion, i.e., in the manner of screw threads, with each newly applied bead contiguous to the next immediately applied bead. During such pulling into place, the bead 94

"necks down" from an original cross-sectional area C at the orifice 64 to a smaller cross-sectional area C', as indicated at reference numeral 96 in FIG. 6. As the body 24 revolves and the bead 94 is extruded, the bead revolves about the central rotational axis, assuming a curve as shown in FIG. 2.

Following application, centrifugal force causes the extruded material to flow toward the body 24, completely surrounding the reinforcement 80 and 82, if present, gradually flattening out, as indicated in FIG. 6. Flattening out of the extrudate may not be accomplished to the desired degree at the rate of rotation R established for the extrusion step; accordingly, it may be desirable, following completion of extrusion of the bead 94, to increase the speed of rotation to R'. The extrudate is then cured in accordance with conventional procedures.

Figure 7:
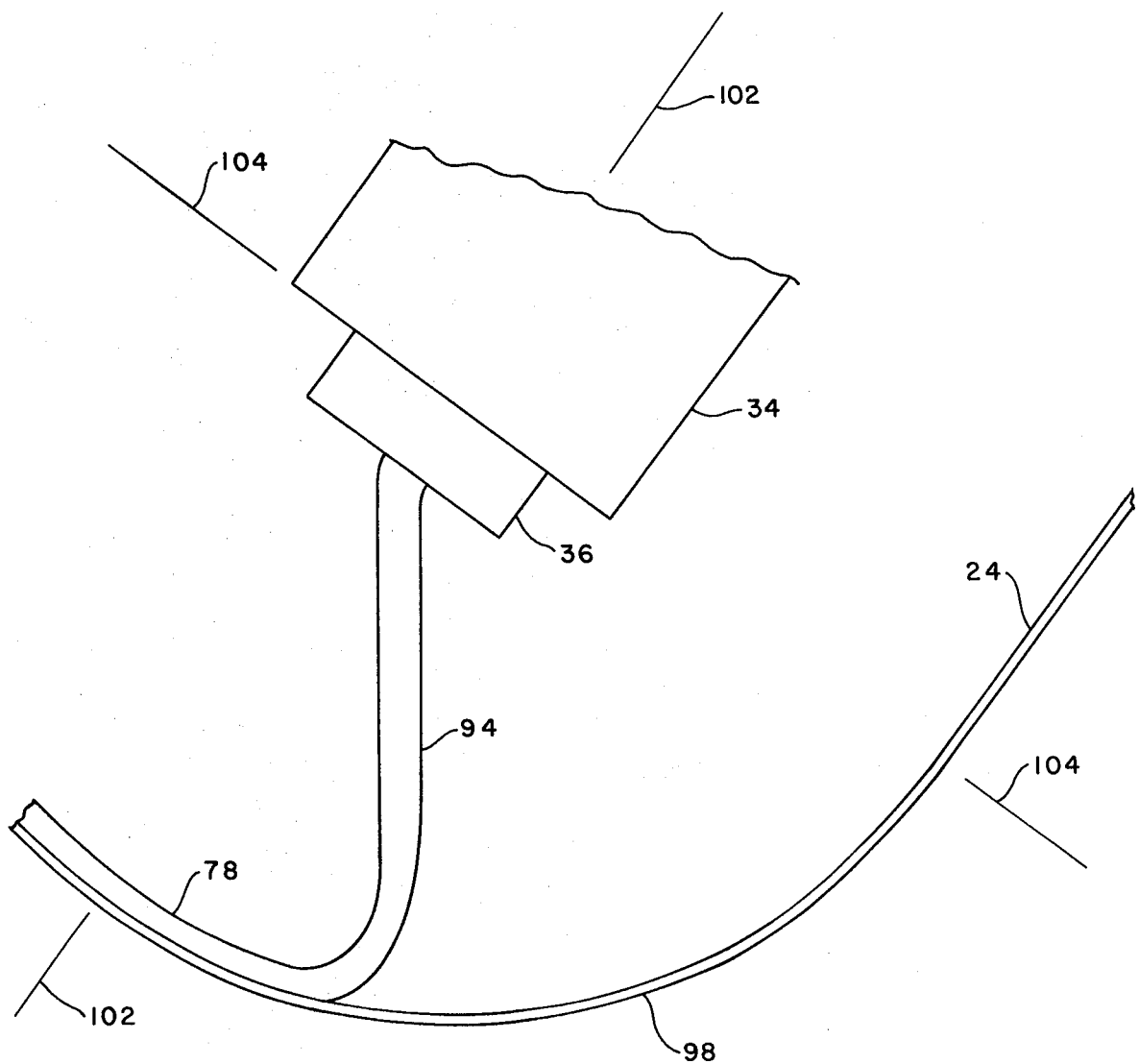
FIG. 7 illustrates application and smoothing out of a polymeric material in a hemispherical end portion of a cylindrical body.

The cylindrical body 24 may have non-cylindrical portions. Referring again to FIG. 1, the body 24 has a hemispherical closed end 98 and a convergent/divergent section 100 at the opposite end. Referring now to FIG. 7, the hemispherical closure 98 is integral with the body 24. In order to spin cast the liner 78 into the closure 98, the frame assembly shown in FIG. 1 is raised to the vertical position 20, the extruder head 36 is positioned as desired and the spin casting is commenced. As the area below the extruder head 36 is filled with extrudate, the attitude of the frame assembly is changed from the vertical, as indicated by the vertical reference line 102—102, toward the horizontal, as indicated by the vertical reference line 104—104, with the bead 94 shown in an intermediate position. When the horizontal attitude is reached, the apparatus is maintained in that attitude while the liner is applied to the right circular cylindrical portion of the body 24. At the converging portion of section 98 the frame assembly 10 is lowered to a below horizontal attitude, as indicated by the reference numeral 22. The frame assembly 10 is thereafter raised to above the horizontal to apply the liner to the diverging portion of section 98.

The method and apparatus of this invention can be employed to spin cast any spin castable, curable material, such as castable refractories and polymeric materials. One such polymeric material is a silicone-based ablative elastomeric material designated DC93104, available from Dow Corning Company, Midland, Michigan.

As discussed previously, the liner 78 may have a plurality of fibrous reinforcing materials 88 uniformly dispersed therethrough. For high temperature applications, it is preferred that such fibrous reinforcement be carbon fibers. For other applications, other fibers, such as asbestos, aromatic polyamide, polyamide, polyester and the like, may be employed. Such fibrous material may comprise about 1 to 20 weight percent of the matrix material, i.e., the refractory or polymeric material, preferably about 3 to 10 weight percent. The castable material may also comprise filler material, antioxidants, antiozonants, curing agents, and the like.

The fibrous reinforcement 88 referred to above is oriented circumferentially. The fibers 88 are oriented during extrusion through the conical passage 66 and further oriented as the bead 94 is pulled into place by the spinning body 24.

The speed of rotation of the cylindrical body 24 during the applying, smoothing and curing steps may be the same or different for each step, and such speed is somewhat dependent upon the material used to form the liner 78. In general, the rotational speed will be in the approximate range of 150 to 350 rpm for the applying step, 250 to 450 rpm for the smoothing step and 100 to 200 rpm for the curing step.

The cast material is at least partially cured while the body is spinning. Once the material is cured to the point that it will hold its shape, the product can be removed from the spin casting apparatus and taken elsewhere for final curing. The product can, of course, be completely cured while mounted on the apparatus. Curing is accomplished by conventional methods, including the controlled application of heat.

Various modifications may be made to the above-described invention without departing from the spirit thereof or the scope of the appended claims.

I claim:

1. A method for spin casting an extrudable uncured material to form a concentric layer of controlled thickness on the interior of an elongated cylindrical body which comprises the steps of rotating an elongated cylindrical body at a desired speed of rotation about its longitudinal axis, applying said extrudable uncured material as a continuous ribbon in helical fashion from one selected point in said body to another selected point in said body, with each newly applied turn contiguous to the next immediately applied turn, continuing to rotate said body until said material is leveled between said selected points, and at least partially curing said material while continuing to rotate said body.

2. The method of claim 1 wherein said material applying step is carried out at a first speed of rotation and said material leveling step is carried out at a second speed of rotation.

3. The method of claim 2 wherein said first speed is in the approximate range of 150 to 350 rpm and said second speed is in the approximate range of 250 to 450 rpm.

4. The method of claim 1 wherein said cylindricl body is maintained in a horizontal attitude during said material applying step.

5. The method of claim 1 wherein the attitude of said cylindrical body is changed during said material applying step.

6. The method of claim 5 wherein said material applying step is initiated with said cylindrical body in a vertical attitude and wherein the attitude of said body is changed to the horizontal during said applying step.

7. The method of claim 1 wherein said extrudable uncured material is a castable refractory.

8. The method of claim 1 wherein said extrudable uncured material is a polymeric material.

9. The method of claim 8 whererin said polymeric material is a silicone-based ablative material.

10. The method of claim 8 wherein said polymeric material has a plurality of fibrous reinforcing materials homogeneously dispersed therethrough.

* * * * *